May 1, 1951 H. J. HORN 2,551,327
VEHICLE WHEEL COVER
Filed June 18, 1948 2 Sheets-Sheet 1

Inventor
HARRY J. HORN
By Barnes, Kisselle, Laughlin & Raisch
Attorneys

Inventor
HARRY J. HORN

Patented May 1, 1951

2,551,327

UNITED STATES PATENT OFFICE 2,551,327

VEHICLE WHEEL COVER

Harry J. Horn, Lansing, Mich., assignor to Motor Wheel Corporation, Lansing, Mich., a corporation of Michigan Application June 18, 1948, Serial No. 33,780

11 Claims. (Cl. 301—37)

This invention relates to a vehicle wheel cover.

It is old in the art to detachably mount a cover on a vehicle wheel. Since the wheel cover covers the bolts or cap screws which secure the wheel to the hub, it is necessary that the cover be detachable. The prior art is replete with snap-on type wheel covers. One of the disadvantages of detachable wheel covers now in use is that they are readily and frequently lost by disengaging themselves from the wheel during usage, particularly when the vehicle is rolling over a rough or bumpy road. Another disadvantage of the currently used snap-on type wheel cover is the expense involved in the fabrication of the spring clips which interengage the cover and in the mounting of these clips on the wheel.

This invention contemplates a detachable wheel cover which can be readily snapped into interengagement with the wheel but which cannot be disengaged from the wheel by pounding or vibration such as occurs when the vehicle is rolling over rough and bumpy highway.

The invention also contemplates a detachable cover which cannot be accidentally disengaged from the wheel but which can be very easily disengaged from the wheel by the application of the proper tool, such as a screw-driver, to the securing means.

It is also an object of this invention to produce a wheel cover which is effectively and securely interengaged with the wheel and which is relatively less expensive to fabricate and attach to the wheel than wheel covers presently in use.

Another advantage of my wheel cover is that it covers substantially the entire outer face of the vehicle wheel and that it can be readily secured to the spoke disc type wheel currently in use on all makes of automotive vehicles without the need for in any wise altering such wheel or adding any elements thereto.

Figure 2:
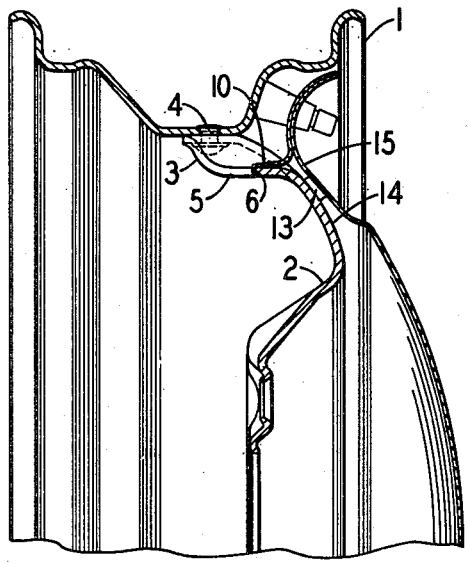
Fig. 2 is a section along the line 2—2 of Fig. 1.
Figure 1:
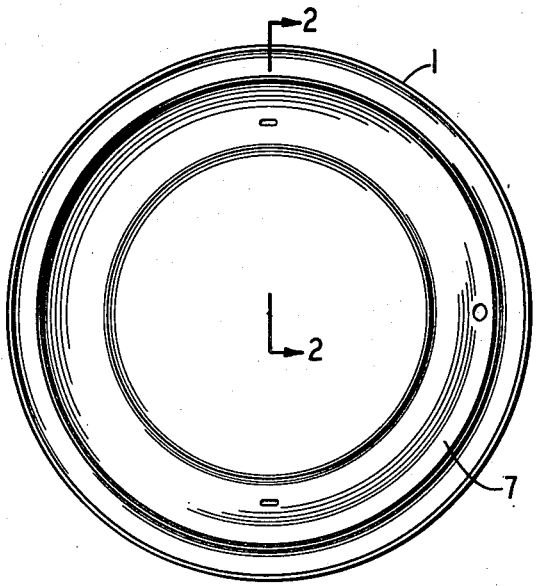
Fig. 1 is a side elevation showing my cover attached to a spoke disc vehicle wheel.
Figure 3:
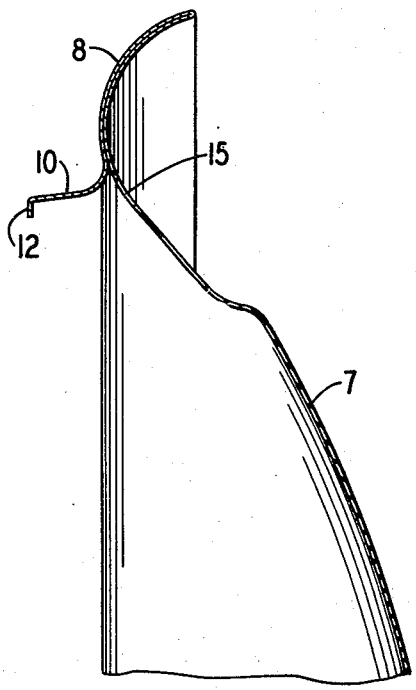
Fig. 3 is a section along the line 3—3 of Fig. 6.

Referring more particularly to the drawings, I have shown a wheel comprising a rim 1, a wheel body 2 in the form of a disc having a plurality of spokes 3 which are secured to the rim 1 by rivets 4. My disc wheel may have any number of spokes but it is conventional to provide such a wheel usually with four or six spokes. The openings between the spokes are designated 5 and the inner edge portion of each of these openings is designated 6.

My cover is generally designated 7. Cover 7 is pressed or formed from any suitable resilient material such, for example, as sheet steel, and preferably is dished.

My cover is provided with four return bent portions, two of which are designated 8 and the other two of which are designated 9. Return bent portions 8 are diametrically opposite each other and return bent portions 9 are also positioned diametrically opposite each other and midway between portions 8. Where there are four return bent portions, I can conveniently make my cover from a square blank of metal and form the return bent portions from the corners of the sheet. The return bent portions 8 and 9 are provided with axially extending tabs 10 and 11 respectively. Tab 10 has its outer end turned radially inwardly to form a flange 12. Tabs 11 do not have such radial flanges. Preferably there will be one return bent portion and tab, such as 8 and 9, for each opening 5 in the wheel body, for example, four return bent portions and tabs for a four spoke wheel and six for a six spoke wheel. For either a four or six spoke wheel the cover would only need two flanged locking tabs, such as 10, with the remainder being plain tabs or, if desired, the tabs could be divided equally into flanged holding tabs and plain tabs. However, it is only necessary for two of these return bent portions to have flanged tabs such as 10.

The inside or concave face of the cover 7 has secured thereto a plurality of resilient pads such as the rubber pads 13. Pads 13 are spaced circumferentially about the cover 7 and are located so that they will contact an approximately vertical side face 14 of the wheel body so that when the cover is mounted on the wheel they are under compression and these resilient pads or members will press or urge the cover 7 axially away from the wheel body. Any spring or elastic element that will perform this function can be used, but rubber pads 13 are preferred because they also act as sound deadeners in that they do not transmit vibrations from wheel body to cover and vice versa.

As shown, cover 7 is provided with an opening 15 for each tab 10, however, one opening 15 is sufficient.

In mounting cover 7 on the wheel, one flanged tab 10 is hooked over on edge portion 6 of the wheel body and the cover is then pressed axially toward the wheel body whereupon the diametrically opposite flanged tab 10 snaps over the diametrically opposite edge portion 6 of the wheel body and locks or hooks the wheel body in place. The plain or unflanged tabs 11 yieldably engage the wheel body portion adjacent the openings 5 and serve to center the cover on the wheel body and tabs 10 in openings 5. When the cover is on the wheel all of the tabs 10 are under tension and tabs 11 are flexed so as to fit tightly against the wheel body. Pads 13 are under compression and hold the cover out of contact with the wheel body so that the cover, in a sense, floats on the wheel body. Further, pads 13 draw flange portions 12 tightly against the edges 6 of the wheel body.

To remove the cover from the wheel an instrument, such as a screw-driver, is passed through an opening 15 and inserted between the inner face of tab 10 and the wheel so that tab 10 is flexed radially outwardly to disengage flange 12 from the edge 6 of the wheel body whereupon the cover can be swung axially outwardly and then moved radially to disengage the other flanged tab from the wheel opening.

Figure 7:
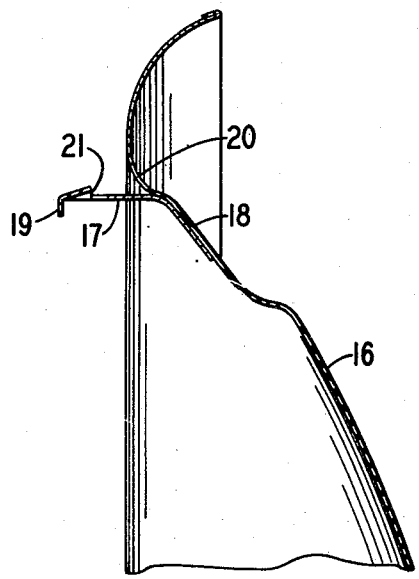
Fig. 7 is a sectional view showing a modification of my wheel cover.
Figure 6:
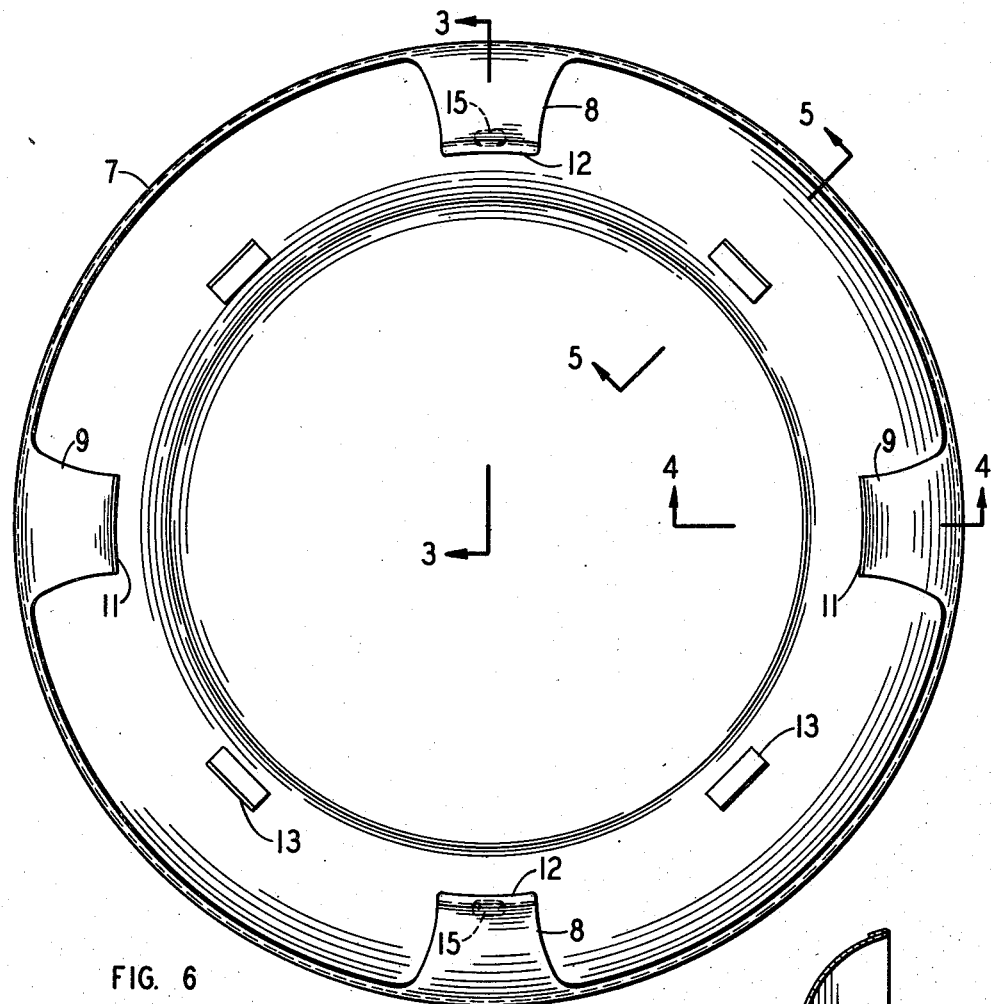
Fig. 6 is an elevation showing the inside of my wheel cover.
Figure 4:
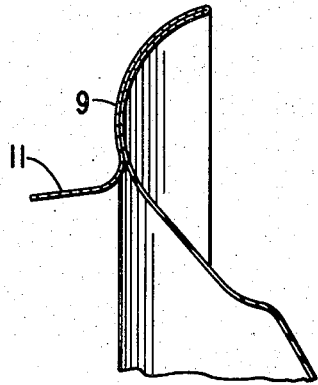
Fig. 4 is a section along the line 4—4 of Fig. 6.
Figure 5:
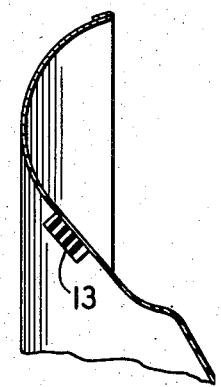
Fig. 5 is a section along the line 5—5 of Fig. 6.

In Fig. 7 I have shown a modified form of wheel cover plate 16 which is similar to cover 7 except that the tabs 17 are formed of separate strips of spring metal welded to the inner face of the cover as at 18. There will be two plain tabs corresponding to tabs 9 and two tabs corresponding to tabs 10 having edge flanges 19. The cover 16 will be provided with an opening 20 radially outwardly of flanged tab 17 and flanged tab 17 will be provided with a socket 21 of a size sufficient to receive the end of a screw-driver or similar instrument. The modified form of wheel cover 16 is advantageous in that the cover 16 can be made of any material desired, resilient or otherwise, and the tabs 17 will be made of the necessary resilient or spring material. Cover 16 is assembled to the wheel and disassembled therefrom in the same manner as cover 7.

I claim:

1. A cover for a wheel body having at least two circumferentially spaced flanged resilient tabs positioned radially inwardly from the edge of said cover on the inside face of said cover and adapted to interengage edge portions of the wheel body to releasably secure the cover to the wheel body, and an opening in said cover positioned adjacent to, and on the radially inner side of, one tab whereby an instrument can be passed through said opening to contact the radially inner face of said tab to disengage the tab from the wheel body.

2. The cover as claimed in claim 1 wherein the flanged tabs are positioned diametrically opposite each other and extend axially from the inside face of the cover.

3. The cover claimed in claim 2 wherein the cover is dished and the flanges on the tabs extend radially inwardly from the ends of the tabs.

4. The cover as claimed in claim 3 including a second pair of tabs positioned diametrically opposite each other midway between the flanged tabs.

5. A cover for a wheel body having at least two circumferentially spaced diametrically opposite return bent portions each extending radially inwardly from the edge of said cover and terminating in an axially positioned tab with a radially inwardly extending flange at the end thereof adapted to interengage edge portions of the wheel body to releasably secure the cover to the wheel body, and an opening in said cover adjacent at least one of said tabs whereby an instrument can be passed through said opening to disengage the tab from the wheel body.

6. The cover claimed in claim 5 wherein the cover is dished and the flanges on the tabs extend radially inwardly from the ends of the tabs.

7. The cover as claimed in claim 6 including a plurality of cushioning members mounted on the inner face of the cover and adapted to cushion the cover on, and space the same from, the wheel body.

8. The combination with a vehicle wheel including a rim and a spoked body having diametrically opposed circumferential edge portions between the spokes, of a concave cover for covering the wheel body and also overlapping the rim, said cover having diametrically opposite tabs positioned radially inwardly from the edge of the cover and extending axially, each tab being provided with a radially inwardly extending flange at its outer edge for interengaging an edge portion of the wheel body to releasably secure the cover to the body, an opening in said cover positioned adjacent to, and on the radially inner side of, at least one of said flanged tabs whereby an instrument may be passed through said opening to contact the radially inner face of said tab to disengage the tab from the edge of the wheel body to disassemble the cover from the wheel.

9. The combination claimed in claim 8 including a plurality of circumferentially spaced cushioning members between the inside face of the cover and the wheel body adapted to be placed under compression and yieldably hold the cover out of contact with the wheel body when the cover is mounted on the wheel body and to press the tab flanges into contact with the edge portions of the wheel body.

10. The combination claimed in claim 5 wherein the cover is provided with diametrically opposite return bent portions positioned between the aforementioned return bent portions and terminating in axially extending tabs which are adapted to yieldably engage the outer face of the wheel body adjacent the edge of the wheel body.

11. The combination claimed in claim 5 wherein the cover is provided with diametrically opposite return bent portions positioned midway between the aforementioned return bent portions and terminating in axially extending tabs which are adapted to yieldably engage the outer face of the wheel body adjacent the edge of the wheel body.

HARRY J. HORN.

REFERENCES CITED

The following references are of record in the file of this patent:

UNITED STATES PATENTS

| Number | Name | Date |
| --- | --- | --- |
| Re. 20,750 | Hunt et al. | June 7, 1938 |
| 2,076,789 | Le Jeune | Apr. 13, 1937 |
| 2,127,220 | Horn | Aug. 16, 1938 |
| 2,231,931 | Lyon | Feb. 18, 1941 |
| 2,358,468 | Mulhern | Sept. 19, 1944 |